(12) United States Patent
Tang et al.

(10) Patent No.: US 9,674,395 B2
(45) Date of Patent: Jun. 6, 2017

(54) METHODS AND APPARATUSES FOR GENERATING PHOTOGRAPH

(71) Applicant: Xiaomi Inc., Beijing (CN)

(72) Inventors: Mingyong Tang, Beijing (CN); Huayijun Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 105 days.

(21) Appl. No.: 14/707,186

(22) Filed: May 8, 2015

(65) Prior Publication Data

US 2016/0065785 A1     Mar. 3, 2016

Related U.S. Application Data

(63) Continuation of application No. PCT/CN2015/071358, filed on Jan. 22, 2015.

(30) Foreign Application Priority Data

Aug. 29, 2014  (CN) .......................... 2014 1 0438203

(51) Int. Cl.

| G06K 9/36 | (2006.01) |
|---|---|
| H04N 1/387 | (2006.01) |
| H04N 5/232 | (2006.01) |
| H04N 5/262 | (2006.01) |
| G06T 3/40 | (2006.01) |
| G06T 11/60 | (2006.01) |

(52) U.S. Cl.
CPC ......... *H04N 1/3876* (2013.01); *G06T 3/4038* (2013.01); *G06T 11/60* (2013.01); *H04N 5/23229* (2013.01); *H04N 5/23258* (2013.01); *H04N 5/2621* (2013.01); *H04N 5/2625* (2013.01)

(58) Field of Classification Search
CPC ......... G06T 2207/10016; G06T 7/2073; G06T 7/2053; G06T 3/4038; G06T 11/60; H04N 1/3876; H04N 5/2625; H04N 5/23258; H04N 5/2621; H04N 5/23229
USPC ....................................................... 382/284
See application file for complete search history.

(56) References Cited

U.S. PATENT DOCUMENTS

| 2009/0238411 | A1* | 9/2009 | Adiletta | G06K 9/00771 382/107 |
|---|---|---|---|---|
| 2010/0034423 | A1* | 2/2010 | Zhao | G06K 9/00785 382/103 |
| 2012/0002112 | A1* | 1/2012 | Huang | H04N 5/144 348/579 |
| 2012/0154579 | A1* | 6/2012 | Hampapur | G06T 7/2006 348/143 |
| 2012/0162454 | A1* | 6/2012 | Park | H04N 5/145 348/208.6 |

* cited by examiner

*Primary Examiner* — Ali Bayat
(74) *Attorney, Agent, or Firm* — Finnegan, Henderson, Farabow, Garrett & Dunner LLP

(57) ABSTRACT

A method for generating a photograph is provided. The method includes: acquiring n frames of images, wherein n≥2; identifying a moving object and one or more background regions included in the n frames of images; and generating a target photograph based on the moving object and the one or more background regions, wherein the target photograph includes at least two images of the moving object located in a same background region, and the at least two images of the moving object include at least two different motion states of the moving object.

17 Claims, 12 Drawing Sheets

METHODS AND APPARATUSES FOR GENERATING PHOTOGRAPH

CROSS-REFERENCE TO RELATED APPLICATION

This application is a continuation application of International Application No. PCT/CN2015/071358, filed Jan. 22, 2015, which is based upon and claims priority to Chinese Patent Application No. 201410438203.9, filed Aug. 29, 2014, the entire contents of all of which are incorporated herein by reference.

TECHNICAL FIELD

The present disclosure generally relates to the field of image processing and, more particularly, to methods and apparatuses for generating a photograph.

BACKGROUND

A photograph showing a trajectory of a moving object often provides a unique visual effect to a viewer and may be referred to as a trajectory photograph. Generally, professional photography skills are required to capture the trajectory of the moving object. During the photographing process, a tripod is often necessary to mount a camera, and the shutter speed needs to be set according to the moving speed of the moving object to produce a high-quality trajectory photograph. Such an operation is relatively complicated and specialized, and it may be difficult for an ordinary user to capture a high-quality trajectory photograph.

SUMMARY

According to a first aspect of the present disclosure, there is provided a method for generating a photograph, comprising: acquiring n frames of images, wherein n≥2; identifying a moving object and one or more background regions included in the n frames of images; and generating a target photograph based on the moving object and the one or more background regions, wherein the target photograph includes at least two images of the moving object located in a same background region, and the at least two images of the moving object include at least two different motion states of the moving object.

According to a second aspect of the present disclosure, there is provided an apparatus for generating a photograph, comprising: a processor; and a memory for storing instructions executable by the processor. The processor is configured to: acquire n frames of images, wherein n≥2; identify a moving object and one or more background regions included in the n frames of images; and generate a target photograph based on the moving object and the one or more background regions, wherein the target photograph includes at least two images of the moving object located in a same background region, and the at least two images of the moving object include at least two different motion states of the moving object.

According to a third aspect of the present disclosure, there is provided a non-transitory computer-readable storage medium having stored therein instructions that, when executed by a processor of an apparatus, cause the apparatus to perform a method for generating a photograph, the method comprising: acquiring n frames of images, wherein n≥2; identifying a moving object and one or more background regions included in the n frames of images; and generating a target photograph based on the moving object and the one or more background regions, wherein the target photograph includes at least two images of the moving object located in a same background region, and the at least two images of the moving object include at least two different motion states of the moving object.

It is to be understood that both the foregoing general description and the following detailed description are exemplary rather than limiting the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention, instead, they are merely examples of apparatuses and methods consistent with aspects related to the invention as recited in the appended claims.

Figure 1:
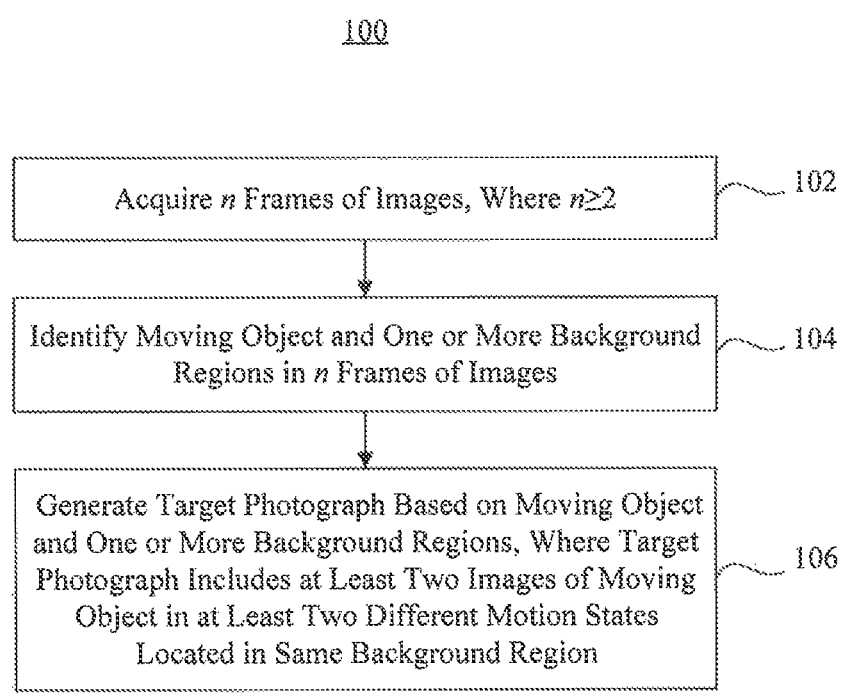
FIG. 1 is a flowchart of a method for generating a photograph, according to an exemplary embodiment.

FIG. 1 is a flowchart of a method 100 for generating a photograph, according to an exemplary embodiment. The method 100 may be performed by an electronic device configured with photographing and image processing capabilities. For example, the electronic device can be a smart phone, a tablet, an E-book reader, a laptop, a camera, etc. Referring to FIG. 1, the method 100 includes the following steps.

In step 102, the electronic device acquires n frames of images, where n≥2.

In step 104, the electronic device identifies a moving object and one or more background regions in the n frames of images.

In step 106, the electronic device generates a target photograph based on the moving object and the one or more background regions, where the target photograph includes at least two images of the moving object in at least two different motion states located in a same background region.

Figure 2:
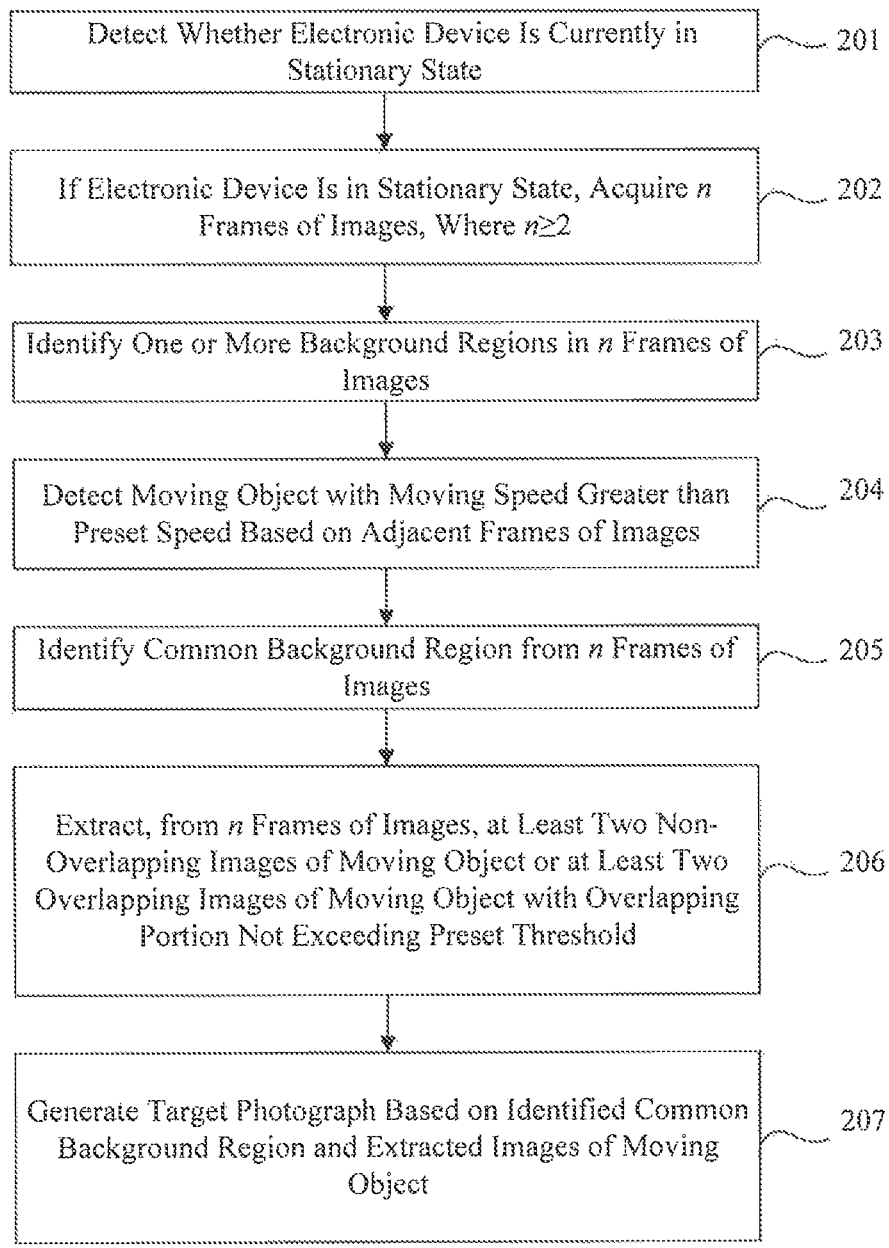
FIG. 2 is a flowchart of a method for generating a photograph, according to an exemplary embodiment.

FIG. 2 is a flowchart of a method 200 for generating a photograph, according to an exemplary embodiment. The method 200 may be performed by an electronic device configured with photographing and image processing capabilities, such as a smart phone, a tablet, an E-book reader, a laptop, a camera, etc. Referring to FIG. 2, the method 200 includes the following steps.

In step 201, the electronic device detects whether it is currently in a stationary state. For example, when a shooting function of the electronic device is turned on, the electronic device may detect whether it is currently in a stationary state based on sensor data obtained from a sensor disposed on the electronic device. Also for example, the sensor may include one or more of a gravity acceleration sensor, a gyroscope and an electronic compass sensor. The electronic device may detect whether the sensor data changes, and if the sensor data does not change, it may determine that the electronic device is currently in a stationary state.

The electronic device may also detect whether a background region obtained by an image sensor of the electronic device changes, and if the background region does not change, it may determine that the electronic device is currently in a stationary state.

The electronic device may also first determine whether the sensor data changes, and if the sensor data does not change, the electronic device may then determine whether a background region obtained by an image sensor of the electronic device changes, to detect whether it is currently in a stationary state.

If the electronic device detects that it is currently in the stationary state, it may proceed to step 202. If the electronic device detects that it is in a non-stationary state, the electronic device may repeat step 201.

In step 202, if the electronic device is detected to be in a stationary state, the electronic device acquires n frames of images, where n≥2.

In some embodiments, step 202 may include the following sub-steps. In a first sub-step, the electronic device captures a video. In a second sub-step, the electronic device extracts n frames of images from the video. For example, the electronic device may extract each frame of image in the video to obtain the n frames of images. In some implementations, the n frames of images are sequenced according to a shooting time, and have the same or similar background regions. The electronic device may also extract one frame of image at a predetermined interval in the video to obtain the n frames of images.

For example, assuming that the video includes 24 frames of images, the electronic device may extract each frame of image in the video, and acquire 24 frames of images in total. Alternatively, the electronic device may extract one frame of image at each interval of 4 frames of images, and acquire 6 frames of images in total.

In some implementations, the electronic device may also acquire the n frames of images by photographing in a continuous high speed shooting mode, in which a series of photos are captured at a predetermined interval.

In step 203, the electronic device identifies one or more background regions in the n frames of images. In some embodiments, step 203 may include the following sub-steps.

In a first sub-step, the electronic device performs a differential operation on two adjacent frames of images to obtain a differential image. Since a gray level and position of pixels of the background regions usually do not change, the differential image obtained by performing the differential operation on the two adjacent frames of images may represent an image of the moving object.

In a second sub-step, the electronic device performs a differential operation on each of the two adjacent frames of images and the differential image, to obtain a background image corresponding to each of the two adjacent frames of images. Since the differential image represents the image of the moving object, by performing the differential operation on each of the two adjacent frames of images and the differential image, the background image corresponding to each of the two adjacent frames of images is obtained.

It is to be understood that, the above described method serves as an example for identifying the background regions, and the present disclosure does not intend to limit the means to identify the background regions in the n frames of images.

In step 204, the electronic device detects a moving object with a moving speed greater than a preset speed level based on the adjacent frames of images. If the moving speed of the moving object is too low, the generated trajectory photograph may include relatively many images of the moving object, resulting in reduced coverage of the moving object and a lower quality of the trajectory photograph. In some embodiments, the electronic device may be configured to detect the moving speed of the moving object, and step 204 may include the following sub-steps.

In a first sub-step, the electronic device identifies the moving object in the n frames of images. For example, the electronic device may use foreground detection and/or moving target detection technology to detect the moving object in the n frames of images.

Figure 3:
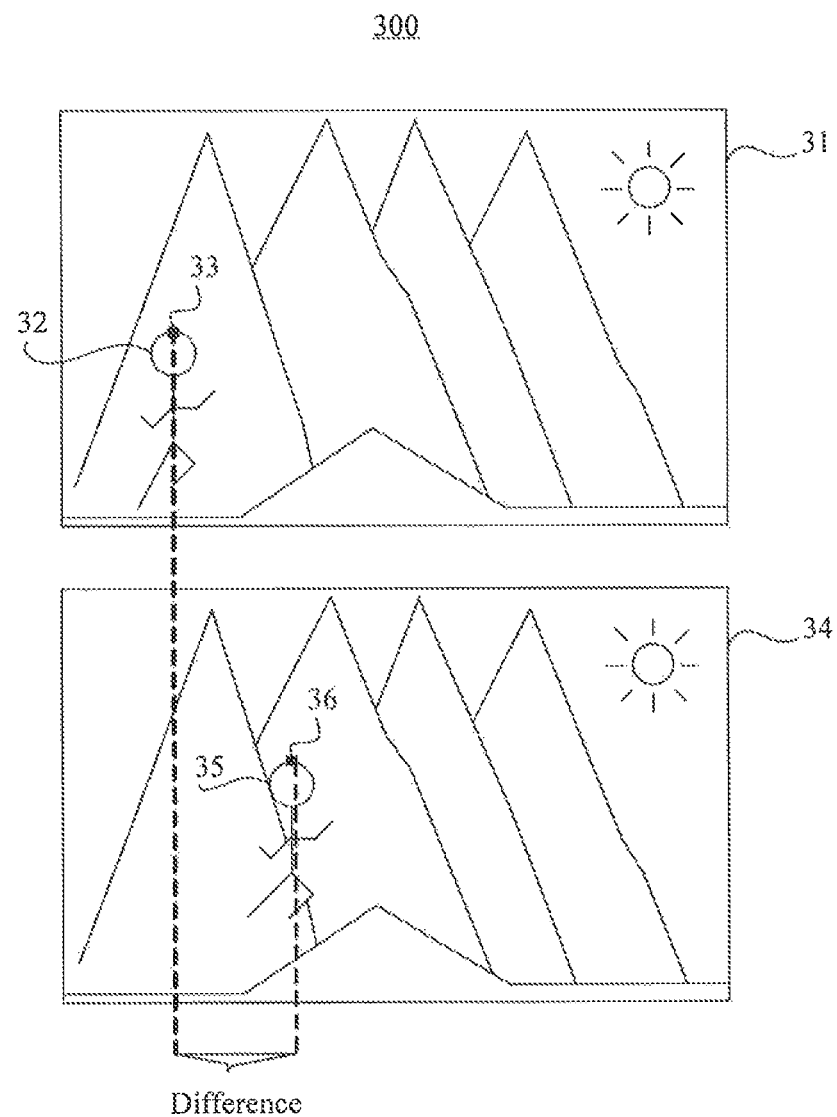
FIG. 3 is a schematic diagram illustrating a method for detecting a moving speed of a moving object, according to an exemplary embodiment.

In a second sub-step, the electronic device obtains a coordinate of a pixel in the image of the moving object in a frame of image. FIG. 3 is a schematic diagram 300 illustrating a method for detecting a moving speed of a moving object, according to an exemplary embodiment. For example, as shown in FIG. 3, the electronic device obtains the coordinate of a pixel 33 in the image 32 of the moving object in the frame 31.

In a third sub-step, the electronic device obtains a coordinate of a corresponding pixel in the image of the moving object in an adjacent frame of image. For example, as shown in FIG. 3, the electronic device obtains the coordinate of a pixel 36 in the image 35 of the moving object in the adjacent frame 34, where the pixel 36 corresponds to the pixel 33 in the image 32 of the moving object in the frame 31.

In a fourth sub-step, the electronic device calculates the moving speed of the moving object according to a difference of the two obtained coordinates. For example, the electronic device may calculate the difference of the coordinate of the pixel 35 and the coordinate of the pixel 36, and calculate the moving speed of the moving object according to the coordinates difference and timing difference between the adjacent frames of images.

In step 205, the electronic device identifies a common background region that is included in each of the n frames of images.

Since the n frames of images are taken when the electronic device is in the stationary state, the n frames of images have the same or similar background regions. After identifying the background regions of the n frames of images, the electronic device may identify the common background region shared by the n frames of images as the background region of the trajectory photograph.

Figure 4:
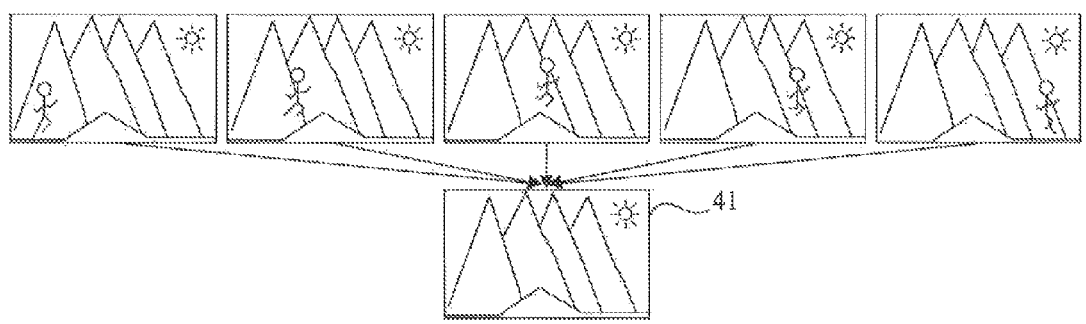
FIG. 4 is a schematic diagram illustrating a method for identifying a common background region, according to an exemplary embodiment.

FIG. 4 is a schematic diagram 400 illustrating a method for identifying a common background region, according to an exemplary embodiment. As shown in FIG. 4, there are 5 frames of images, since the gray levels and positions of pixels in the background regions of the 5 frames of images do not change, by performing a differential operation on the 5 frames of images, the electronic device may identify the common background region 41 of the 5 frames of images.

In step 206, the electronic device extracts, from the n frames of images, at least two non-overlapping images of the moving object or extracts at least two overlapping images of the moving object with an overlapping portion not exceeding a preset threshold. In some embodiments, when non-overlapping images are extracted from the n frames of images, step 206 may include the following sub-steps.

Figure 5:
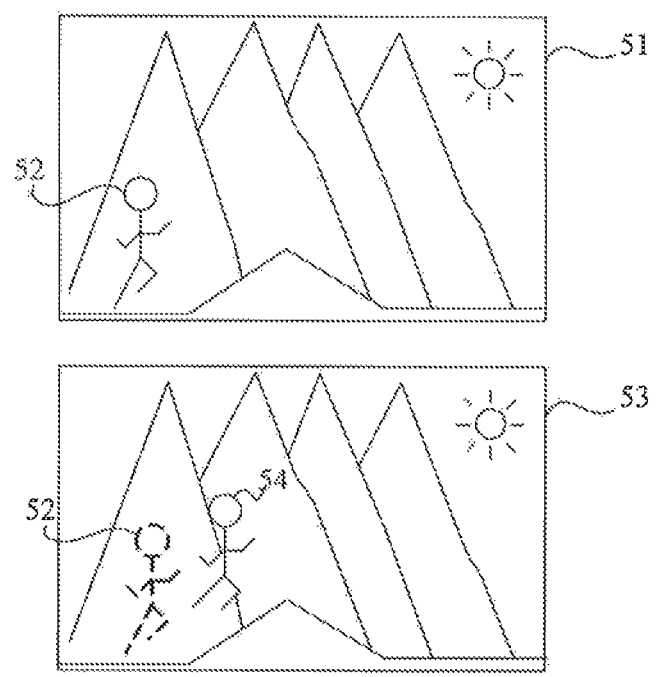
FIG. 5 is a schematic diagram illustrating a method for extracting non-overlapping images of a moving object, according to an exemplary embodiment.

In a first sub-step, the electronic device obtains two coordinate sets corresponding to images of the moving object in two frames of images, respectively. FIG. 5 is a schematic diagram 500 illustrating a method for extracting non-overlapping images of a moving object, according to an exemplary embodiment. As shown in FIG. 5, the electronic device obtains a coordinate set A of an image 52 of the moving object in a frame 51, and obtains a coordinate set B of an image 54 of the moving object in a frame 53.

In a second sub-step, the electronic device detects whether there exist same coordinates in the two coordinate sets. If there exist same coordinates in the two coordinate sets, it is determined that the two images of the moving object are overlapping, and one of the two images of the moving object may be discarded. If no coordinates in the two coordinate sets are the same, the two images of the moving object may be both used. As shown in FIG. 5, the electronic device detects whether there exist same coordinates in the coordinate set A and the coordinate set B. For example, if no coordinates in the coordinate set A and the coordinate set B are the same, it may be determined that the image 54 and the image 52 of the moving object are non-overlapping.

In other embodiments, the electronic device may extract, from the n frames of images, at least two overlapping images of the moving object with an overlapping portion not exceeding a preset threshold. If an overlapping portion is small, the quality of the acquired trajectory photograph may not be much affected. In these embodiments, step 206 may include the following sub-steps.

Figure 6:
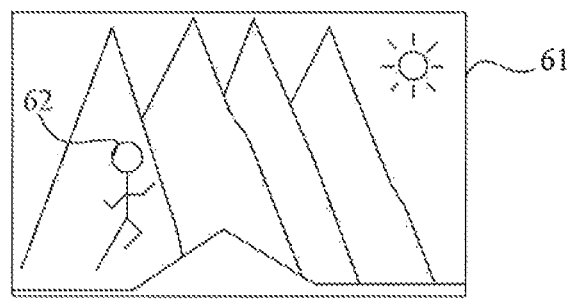
FIG. 6 is a schematic diagram illustrating a method for extracting overlapping images of a moving object, according to an exemplary embodiment.
Figure 6:
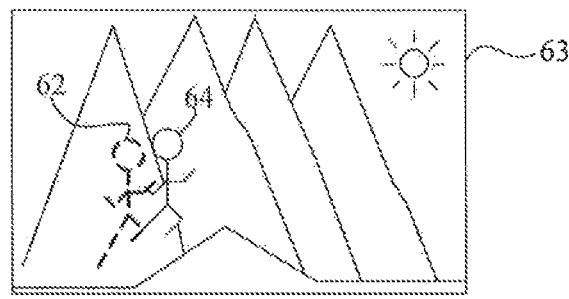

In a first sub-step, the electronic device obtains two coordinate sets corresponding to images of the moving object in two frames of images, respectively. FIG. 6 is a schematic diagram 600 illustrating a method for extracting overlapping images of a moving object, according to an exemplary embodiment. As shown in FIG. 6, the electronic device obtains a coordinate set A of an image 62 of the moving object in a frame 61, and obtains a coordinate set B of an image 64 of the same moving object in a frame 63.

In a second sub-step, the electronic device calculates a ratio of duplicate coordinates in the two coordinate sets. For example, the electronic device may obtain a number of the duplicate coordinates in the two coordinate sets, and then calculate the ratio of the duplicate coordinates in the two coordinate sets.

In a third sub-step, if the ratio is less than or equal to a preset threshold, the electronic device extracts the images of the moving object in the two frames of images. For example, the preset threshold may be set to 10%. In the embodiment in FIG. 6, the ratio of the duplicate coordinates between the coordinate set A of the image 62 of the moving object and the coordinate set B of the image 64 of the moving object is about 5%. The electronic device then extracts the image 62 and the image 64 of the moving object for generating the target photograph. If the ratio is greater than the preset threshold, the electronic device may extract one of the two images of the moving object and discard the other.

In step 207, the electronic device generates the target photograph based on the identified common background region and the extracted images of the moving object. For example, the electronic device may generate the target photograph (i.e., the trajectory photograph) based on the common background region identified from the n frames of images in step 205 and the at least two non-overlapping images of the moving object or the at least two overlapping images of the moving object with the overlapping portion not exceeding the preset threshold extracted in step 207.

Figure 7:
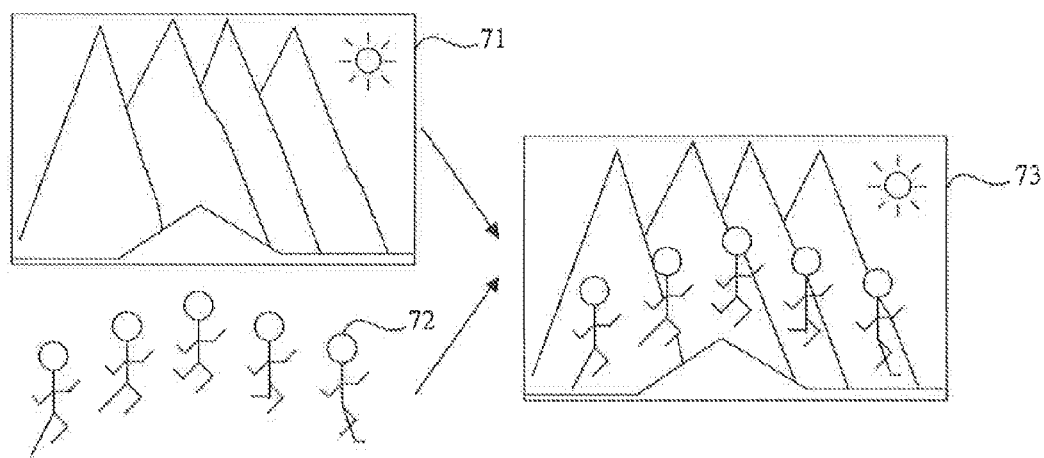
FIG. 7 is a schematic diagram illustrating a method for generating a photograph, according to an exemplary embodiment.

FIG. 7 is a schematic diagram 700 illustrating a method for generating a target photograph, according to an exemplary embodiment. As shown in FIG. 7, the electronic device identifies a common background region 71 from five frames of images, extracts five images 72 of the moving object, and generates the target photograph 73 based on the identified common background region 71 and the five images 72 of the moving object.

The moving object may have a moving speed exceeding the preset threshold detected by the electronic device in step 204. In some embodiments, the electronic device may first generate the background region of the target photograph using the common background region of the n frames of images, and then for each of the extracted images, reproduce each image of the moving object to a corresponding position in the background region of the target photograph according to original relative positions of each image of the moving object relative to the common background region in the n frames of images.

The method 200 produces a target photograph using a common background region shared among n frames of images and at least two non-overlapping or overlapping images of the moving object, thereby allowing a user to generate a high-quality trajectory photograph without involving complex user operations.

In some embodiments, if the background regions of the n frames of images are not exactly the same, but each of the background regions has a large overlapping area with one another, the electronic device may combine the overlapping portions of the background regions to obtain a target background region, and then generate the trajectory photograph based on the target background region and at least two non-overlapping images of the moving object or at least two images of the moving object with the overlapping portion not exceeding the preset threshold.

Figure 8:
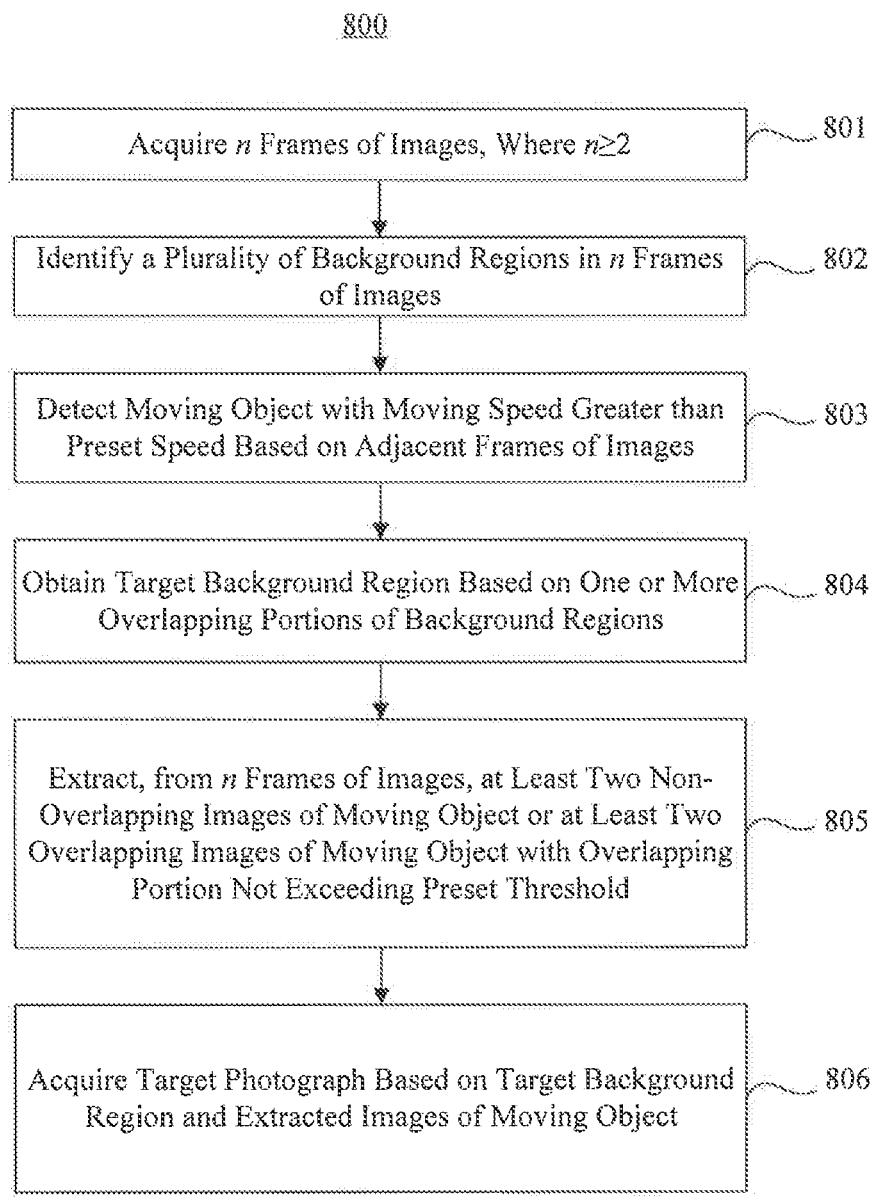
FIG. 8 is a flowchart of a method for generating a photograph, according to an exemplary embodiment.

FIG. 8 is the flowchart of a method 800 for generating a photograph, according to an exemplary embodiment. The method 800 may be performed by an electronic device configured with photographing and image processing capabilities, such as a smart phone, a tablet, an E-book reader, a laptop, a camera, etc. Referring to FIG. 8, the method 800 includes the following steps.

In step 801, the electronic device acquires n frames of images, where n≥2. The n frames of images may be acquired when the electronic device is in a stationary state. In some embodiments, step 801 may include two sub-steps. In a first sub-step, the electronic device may capture a video, and in a second sub-step, the electronic device may extract n frames of images from the video.

The electronic device may extract each frame of image in the video or extract the frames of images in the video at a predetermine interval to obtain the n frames of images. The n frames of images share the same or similar background region.

In some implementations, the electronic device may acquire the n frames of images by photographing in a continuous high speed shooting mode, where the continuous high speed shooting mode is a mode for capturing a series of photos at a predetermined interval.

In step 802, the electronic device identifies a plurality of background regions in the n frames of images. Each of the plurality of background regions may overlap with one another substantially. For example, step 802 can include the following sub-steps.

In a first sub-step, the electronic device performs a differential operation on two adjacent frames of images to obtain a differential image. Since a gray level and position of pixels in the background regions usually do not change, the differential image obtained by performing the differential operation on the two adjacent frames of images may represent an image of the moving object.

In a second sub-step, the electronic device performs a differential operation on each of the two adjacent frames of images and the differential image, to obtain a background image corresponding to each of the two adjacent frames of images. Since the differential image represents the image of the moving object, by performing the differential operation on each of the two adjacent frames of images and the differential image, and the background image corresponding to each of the two adjacent frames of images may be obtained.

It is to be understood that, the above described method serves as an example for identifying the background regions, and the present disclosure does not intend to limit the means to identify the background regions in the n frames of images.

In step 803, the electronic device detects a moving object with a moving speed greater than a preset speed level based on the adjacent frames of images. In some embodiments, step 803 may include the following sub-steps.

In a first sub-step, the electronic device identifies the moving object in the n frames of images. For example, the electronic device may use foreground detection and/or moving target detection technology to detect the moving object in the n frames of images.

In a second sub-step, the electronic device obtains a coordinate of a pixel in the image of the moving object in a frame of image.

In a third sub-step, the electronic device obtains a coordinate of a corresponding pixel in the image of the moving object in an adjacent frame of image.

In a fourth sub-step, the electronic device calculates the moving speed of the moving object based on a difference of the two above coordinates. The electronic device may compare the calculated moving speed of the moving object with a preset speed level to determine whether the moving speed of the moving object is greater than the preset speed level.

In step 804, the electronic device obtains a target background region based on one or more overlapping portions of the plurality of background regions identified in step 802.

For example, the electronic device may combine the plurality of background regions based on the one or more overlapping portions to obtain the target background region. Since the n frames of images may be taken in a non-stationary state or in a relative stationary state (for example, in a moving vehicle), the background regions corresponding to the n frames of images may be not the same. If the background regions corresponding to the n frames of images are not exactly the same and there are one or more overlapping portions among them, the electronic device may combine the background regions to obtain the target background region based on the overlapping portions.

Figure 9:
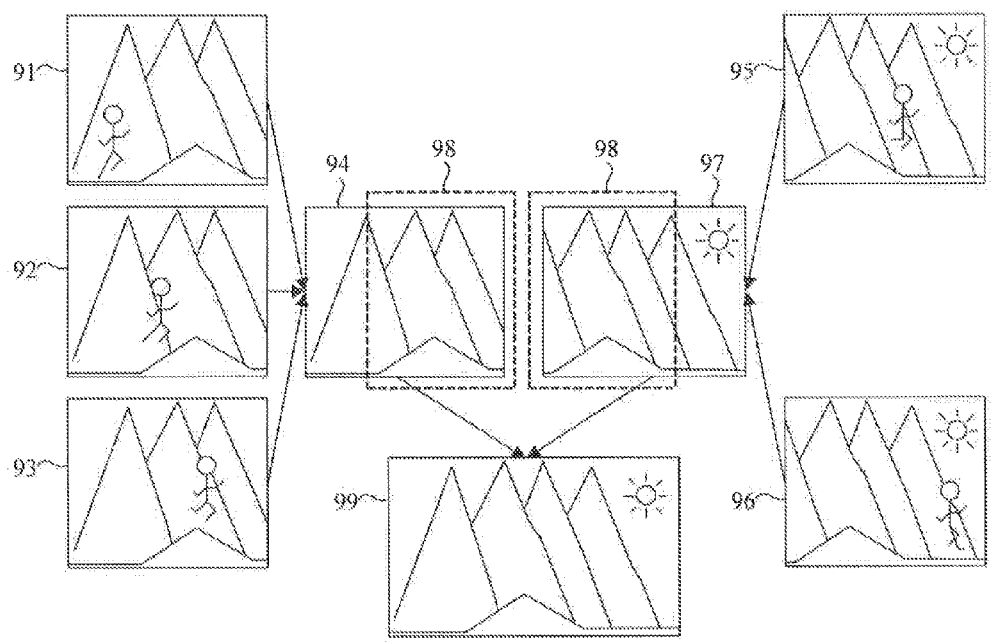
FIG. 9 is a schematic diagram illustrating a method for obtaining a background region of a photograph, according to an exemplary embodiment.

FIG. 9 is a schematic diagram 900 illustrating a method for obtaining a background region of a photograph, according to an exemplary embodiment. As shown in FIG. 9, images 91, 92 and 93 share a common background region 94, images 95 and 96 share a common background region 97 which is different from and overlaps with the common background region 94. The electronic device may identify an overlapping portion 98 between the background region 94 and the background region 97, and combine the background region 94 and background region 97 based on the overlapping portion 98 to obtain a target background region 99.

In step 805, the electronic device extracts at least two non-overlapping images of the moving object from the n frames of images, or extracts at least two images of the moving object with an overlapping portion not exceeding a preset threshold from the n frames of images.

In some embodiments, when non-overlapping images are extracted from the n frames of images, step 805 may include the following steps.

In a first sub-step, the electronic device obtains two coordinate sets corresponding to images of the moving object in two frames of images, respectively.

In a second sub-step, the electronic device detects whether there exist same coordinates in the two coordinate sets. If there exist same coordinates in the two coordinate sets, it is determined the two images of the moving object overlap, and one of the two images of the moving object may be discarded. If no coordinates in the two coordinate sets are the same, the two images of the moving object may be both used.

In other embodiments, the electronic device may extract at least two images of the moving object with an overlapping portion not exceeding a preset threshold from the n frames of images. If an overlapping portion is small, the quality of the generated trajectory photograph may not be much affected. In these embodiments, step 805 may include the following sub-steps.

In a first sub-step, the electronic device obtains two coordinate sets corresponding to images of the moving object in two frames of images, respectively.

In a second sub-step, the electronic device calculates a ratio of duplicate coordinates in the two coordinate sets. For example, the electronic device may obtain a number of the duplicate coordinates in the two coordinate sets, and then calculate the ratio of the duplicate coordinates in the two coordinate sets.

In a third sub-step, if the ratio is less than or equal to a preset threshold, the electronic device extracts the images of the moving object in the two frames of images.

In step 806, the electronic device generates the target photograph based on the target background region obtained in step 804 and the extracted images in step 805. The moving object may have a moving speed exceeding the preset threshold detected by the electronic device in step 803. In some embodiments, the electronic device may first generate the target background region of the target photograph. Then for different images of the moving object, the electronic device may reproduce each image of the moving object to a corresponding position in the target background region of the target photograph according to original relative positions of each image of the moving object relative to the target background region in the n frames of images.

In the method 800, by combining the background regions with an overlapping portion to obtain the target background region, and generating the target photograph based on the target background region, a panorama of the trajectory may be produced in the target photograph.

Figure 10:
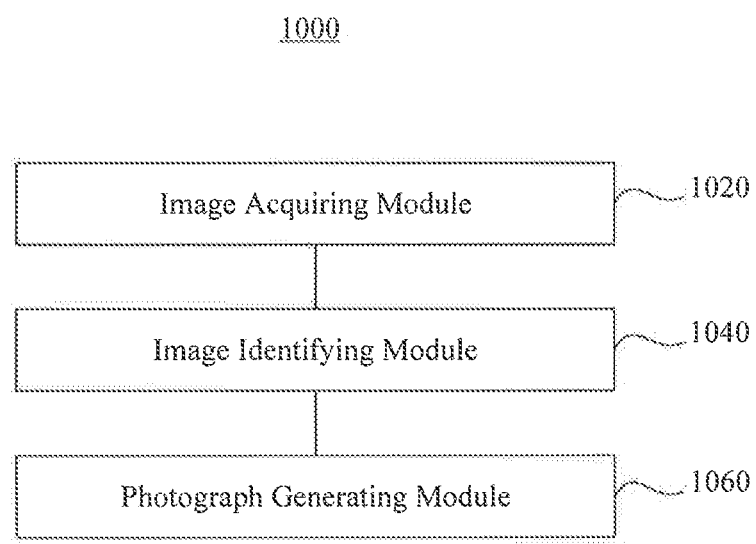
FIG. 10 is a block diagram of an apparatus for generating a photograph, according to an exemplary embodiment.

FIG. 10 is a block diagram of an apparatus 1000 for generating a photograph, according to an exemplary embodiment. The apparatus 1000 may be implemented as all or a part of an electronic, device by software, hardware, or a combination thereof. Referring to FIG. 10, the apparatus 1000 may include an image acquiring module 1020, an image identifying module 1040, and a photograph generating module 1060.

The image acquiring module 1020 is configured to acquire n frames of images, where n≥2.

The image identifying module 1040 is configured to identify one or more background regions and a moving object in the n frames of images.

The photograph generating module 1060 is configured to generate a target photograph based on the background regions and images of moving object, where the target photograph includes at least two images of the moving object in different motion states located in the same background region.

Figure 11:
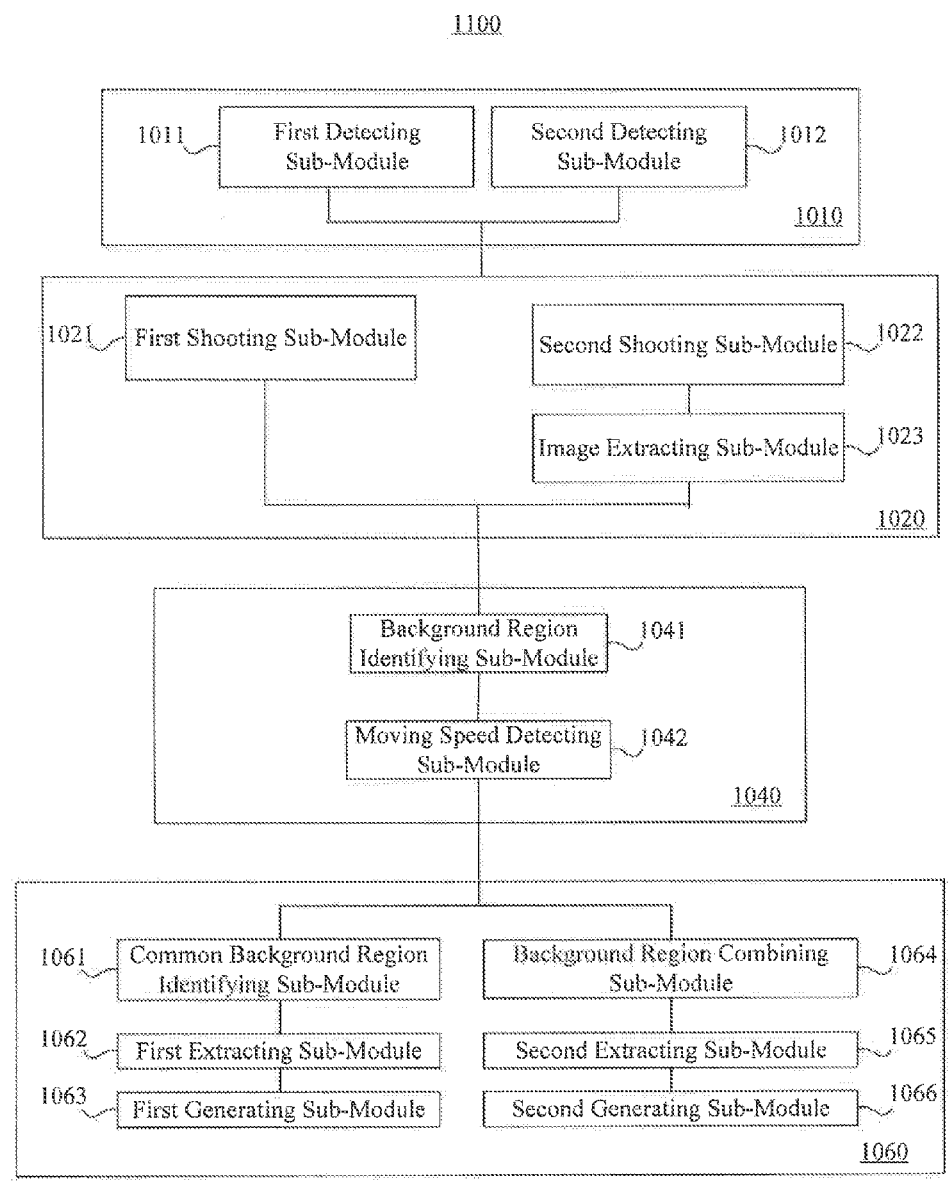
FIG. 11 is a block diagram of an apparatus for generating a photograph, according to an exemplary embodiment.

FIG. 11 is a block diagram of an apparatus 1100 for generating a photograph, according to an exemplary embodiment. The apparatus 1100 may he implemented as all or a part of an electronic device by software, hardware, or a combination thereof. Referring to FIG. 11, the apparatus 1100 may include the image acquiring module 1020, the image identifying module 1040, and the photograph generating module 1060 (FIG. 10).

In some embodiments, the image acquiring module 1020 may include a first shooting sub-module 1021. The first shooting sub-module 1021 is configured to take photos in a continuous high speed shooting mode to obtain the n frames of images, in which a series of photos are continuously captured at a predetermined interval.

In some embodiments, the image acquiring module 1020 may include a second shooting sub-module 1022 and an image extracting sub-module 1023. The second shooting sub-module 1022 is configured to capture a video, and the image extracting sub-module 1023 is configured to extract n frames of images from the video.

In some embodiments, the apparatus 1100 may further include a stationary state detecting module 1010. The stationary state detecting module 1010 is configured to detect whether an electronic device is currently in a stationary state. The image acquiring module 1020 may he configured to acquire n frames of images if the stationary state detecting module 1010 detects that the electronic device is currently in a stationary state.

In some embodiments, the stationary state detecting module 1010 may include a first detecting sub-module 1011 and a second detecting sub-module 1012. The first detecting sub-module 1011 is configured to obtain sensor data from a sensor disposed on the electronic device. The sensor may include one or more of a gravity acceleration sensor, a gyroscope, an electronic compass sensor, or the like. The first detecting sub-module 1011 may be configured to detect whether the sensor data changes. If the sensor data does not change, the first detecting sub-module 1011 may determine that the electronic device is currently in a stationary state. The second detecting sub-module 1012 is configured to detect whether a background region obtained by an image sensor of the electronic device changes, if the background region does not change, the second detecting sub-module 1012 may determine that the electronic device is currently in a stationary state.

In some embodiments, the image identifying module 1040 may include a background region identifying sub-module 1041 and a moving speed detecting sub-module 1042. The background region identifying sub-module 1041 is configured to identify the one or more background regions in the n frames of images. The moving speed detecting sub-module 1042 is configured to detect a moving object with a moving speed greater than a preset speed level in the background regions based on adjacent frames of images.

In some embodiments, the photograph generating module 1060 may include a common background region identifying sub-module 1061, a first extracting sub-module 1062, and a first generating sub-module 1063. The common background region identifying sub-module 1061 is configured to identify the common background region from the n frames of images. The first extracting sub-module 1062 is configured to extract at least two non-overlapping images of the moving object from the n frames of images, or extract at least two overlapping images of the moving object with an overlapping portion not exceeding a preset threshold from the n frames of images. The first generating sub-module 1063 is configured to generate the target photograph based on the identified common background region and the at least two images of the moving object extracted by the first extracting sub-module 1062.

In some embodiments, the photograph generating module 1060 may include a background region combining sub-module 1064, a second extracting sub-module 1065, and a second generating sub-module 1066. The background region combining sub-module 1064 is configured to obtain a target background region by combining overlapping portions of the background regions. The second extracting sub-module 1065 is configured to extract at least two non-overlapping images of the moving object from the n frames of images, or extract at least two overlapping images of the moving object with an overlapping portion not exceeding a preset threshold from the n frames of images. The second generating sub-module 1066 is configured to generate the target photograph based on the target background region and the at least two non-overlapping or overlapping images of the moving object extracted by the second extracting sub-module 1066.

Figure 12:
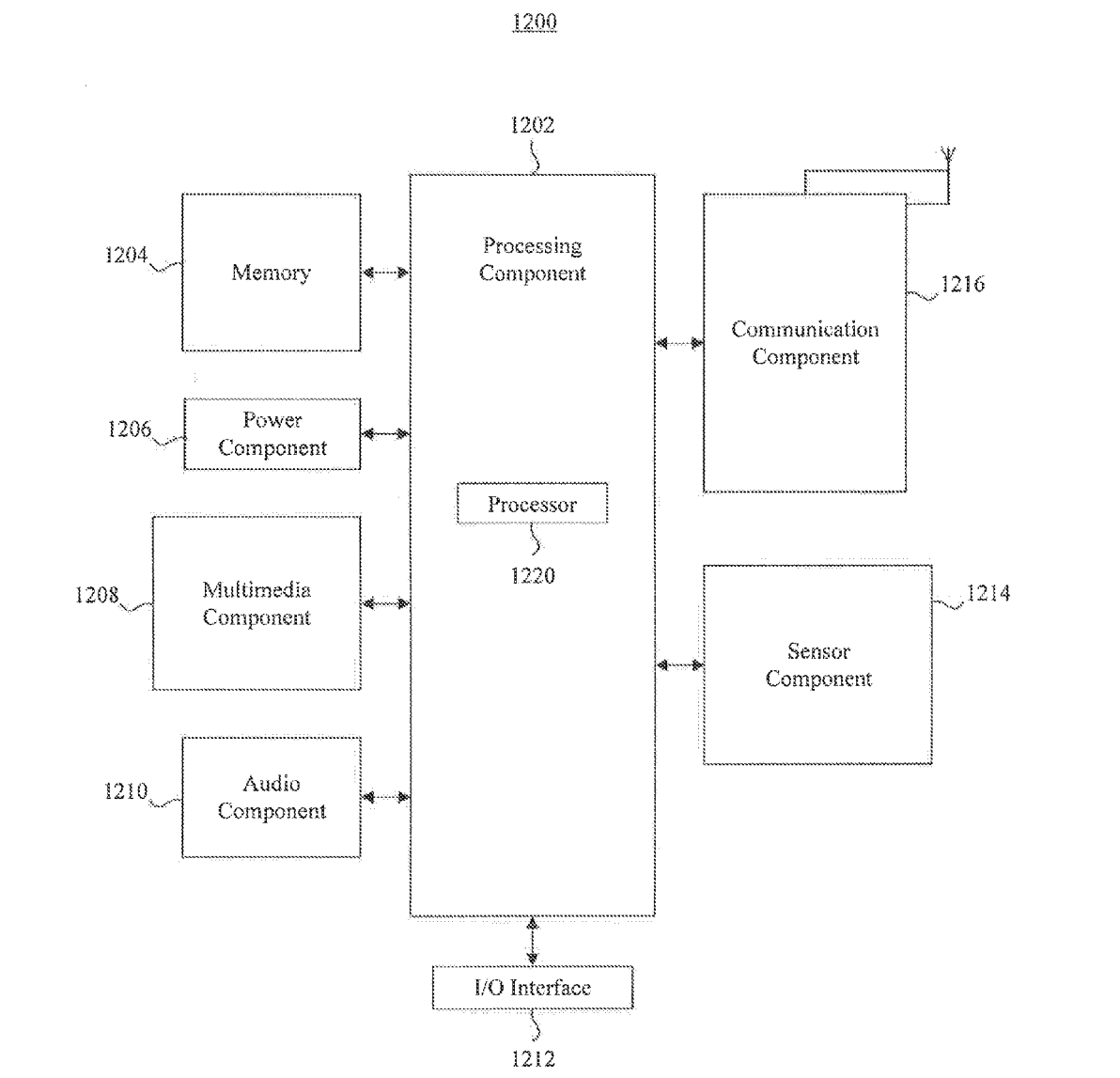
FIG. 12 is a block diagram of an electronic device, according to an exemplary embodiment.

FIG. 12 is a block diagram of an electronic device 1200 for acquiring a photograph, according to an embodiment. For example, the electronic device 1200 may be a device configured with an image processing capability, such as a mobile telephone, a computer, a digital broadcasting terminal, a message transceiver device, a games console, a tablet device, a medical device, a fitness facility, a personal digital assistant (PDA) and the like.

Referring to FIG. 12, the electronic device 1200 may include one or more of the following components: a processing component 1202, a memory 1204, a power component 1206, a multimedia component 1208, an audio component 1210, an input/output (I/O) interface 1212, a sensor component 1214 and a communication component 1216. The person skilled in the art should appreciate that the structure of the electronic device 1200 as shown in FIG. 12 does not intend to limit the electronic device 1200. The electronic device 1200 may include more or less components or combine some components or other different components.

The processing component 1202 typically controls overall operations of the electronic device 1200, such as the operations associated with display, telephone calls, data communications, camera operations, and recording operations. The processing component 1202 may include one or more processors 1220 to execute instructions so as to perform all or a part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the electronic device 1200. Examples of such data include instructions for any applications or methods operated on the electronic device 1200, contact data, phonebook data, messages, pictures, videos, etc. The memory 1204 is also configured to store programs and modules. The processing component 1202 performs various functions and data processing by operating programs and modules stored in the memory 1204. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 is configured to provide power to various components of the electronic device 1200. The power component 1206 may include a power management system, one or more power sources, and other components associated with the generation, control, and distribution of power in the electronic device 1200.

The multimedia component 1208 includes a screen configured to provide an output interface between the electronic device 1200 and the user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum when the electronic device 1200 is in an operation mode such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone configured to receive an external audio signal when the electronic device 1200 is in an operation mode, such as a call mode, a recording mode, and a voice recognition mode. The received audio signal may be further stored in the memory 1204 or transmitted via the communication component 1216. In some embodiments, the audio component 1210 further includes a loud speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the electronic device 1200. For instance, the sensor component 1214 may detect an on/off status of the electronic device 1200, relative positioning of components (e.g., a display screen and a keypad) of the electronic device 1200. The sensor component 1214 may further detect a change in position of the electronic device 1200 or a component of the electronic device 1200, a presence or absence of user contact with the electronic device 1200, an orientation or an acceleration/deceleration of the electronic device 1200, and a change in temperature of the electronic device 1200. The sensor component 1214 may include a proximity sensor configured to detect the presence of nearby objects without any physical contact. The sensor component 1214 may further include a light sensor, such as a CMOS or CCD image sensor, for use in imaging applications, in some embodiments, the sensor component 1214 may also include an accelerometer sensor, a gyroscope sensor, a magnetic sensor, a pressure sensor, or a temperature sensor.

The communication component 1216 is configured to facilitate a wired or wireless communication between the electronic device 1200 and other terminals. The electronic device 1200 can access a wireless network based on a communication standard, such as WiFi, 2G, or 3G, or a combination thereof. In one exemplary embodiment, the communication component 1216 receives a broadcast signal or information from an external broadcast control system via a broadcast channel. In one exemplary embodiment, the communication component 1216 further includes a near field communication (NFC) module to facilitate short-range communications. For example, the NFC module may be implemented based on a Radio Frequency Identification (RFID) technology, an Infrared Data Association (IrDA) technology, an Ultra-wideband (UWB) technology, a Bluetooth (BT) technology, or other technologies.

In exemplary embodiments, the electronic device 1200 may be implemented with one or more electronic elements such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is further provided a non-transitory computer readable storage medium including instructions, such as the memory 1204 including instructions executable by the processor 1220 in the electronic device 1200, to perform the above-described methods. For example, the non-transitory computer-readable storage medium may be a read-only memory (ROM), a random access memory (RAM), a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may he further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for generating a photograph, comprising:
    acquiring n frames of images, wherein n≥2;
    identifying a moving object and one or more background regions included in the n frames of images;
    detecting, based on adjacent frames in the n frames of images, that a moving speed of the moving object is greater than a preset speed level; and
    generating a target photograph based on the moving object and the one or more background regions, wherein the target photograph includes at least two images of the moving object located in a same background region, and the at least two images of the moving object include at least two different motion states of the moving object.

2. The method according to claim 1, wherein acquiring n frames of images comprises:
    capturing a series of photos using a continuous high speed shooting mode, wherein each of the series of photos is captured at a predetermined interval.

3. The method according to claim 1, wherein acquiring n frames of images comprises:
    capturing a video; and
    extracting the n frames of images from the video.

4. The method according to claim 1, further comprising:
    detecting whether an electronic device is in a stationary state; and
    acquiring the n frames of images if it is detected that the electronic device is in the stationary state.

5. The method according to claim 4, wherein detecting whether the electronic device is in a stationary state comprises:
    acquiring sensor data from a sensor disposed on the electronic device;
    detecting whether the sensor data changes; and
    determining that the electronic device is in the stationary state if it is detected that the sensor data does not change.

6. The method according to claim 4, wherein detecting whether the electronic device is in a stationary state comprises:
    detecting whether a background region obtained by an image sensor of the electronic device changes; and
    determining that the electronic device is in the stationary state if it is detected that the background region does not change.

7. The method according to claim 1, wherein generating a target photograph comprises:
    identifying a common background region in the n frames of images;
    extracting, from the n frames of images, at least two non-overlapping images of the moving object or at least two overlapping images of the moving object with an overlapping portion not exceeding a preset threshold; and
    generating the target photograph based on the common background region and the at least two non-overlapping or overlapping images.

8. The method according to claim 1, wherein generating a target photograph comprises:
    identifying a plurality of background regions from the n frames of images, the plurality of background regions including one or more overlapping portions;
    combining the plurality of background regions based on the one or more overlapping portions of the background regions to obtain a target background region;
    extracting, from the n frames of images, at least two non-overlapping images of the moving object or at least two overlapping images of the moving object with an overlapping portion not exceeding a preset threshold; and
    generating the target photograph based on the target background region and the at least two non-overlapping or overlapping images of the moving object.

9. An apparatus for generating a photograph, comprising:
    a processor; and
    a memory for storing instructions executable by the processor;
    wherein the processor is configured to:
    acquire n frames of images, wherein n≥2;
    identify a moving object and one or more background regions included in the n frames of images;
    detect, based on adjacent frames in the n frames of images, that a moving speed of the moving object is greater than a preset speed level; and
    generate a target photograph based on the moving object and the one or more background regions, wherein the target photograph includes at least two images of the moving object located in a same background region, and the at least two images of the moving object include at least two different motion states of the moving object.

10. The apparatus according to claim 9, wherein the processor is configured to acquire n frames of images by:
    capturing a series of photos using a continuous high speed shooting mode, wherein each of the series of photos is captured at a predetermined interval.

11. The apparatus according to claim 9, wherein the processor is configured to acquire n frames of images by:
    capturing a video; and
    extracting the n frames of images from the video.

12. The apparatus according to claim 9, wherein the processor is further configured to:
    detect whether an electronic device is in a stationary state; and
    acquire the n frames of images if it is detected that the electronic device is in the stationary state.

13. The apparatus according to claim 12, wherein the processor is configured to detect whether an electronic device is in a stationary state by:
    acquiring sensor data from a sensor disposed on the electronic device;
    detecting whether the sensor data changes; and determining that the electronic device is in the stationary state if it is detected that the sensor data does not change.

14. The apparatus according to claim 12, wherein the processor is configured to detect whether an electronic device is in a stationary state by:
   detecting whether a background region obtained by an image sensor of the electronic device changes; and
   determining that the electronic device is in the stationary state if it is detected that the background region does not change.

15. The apparatus according to claim 9, wherein the processor is configured to generate a target photograph by:
   identifying a common background region in the n frames of images;
   extracting, from the n frames of images, at least two non-overlapping images of the moving object or at least two overlapping images of the moving object with an overlapping portion not exceeding a preset threshold; and
   generating the target photograph based on the common background region and the at least two non-overlapping or overlapping images.

16. The apparatus according to claim 9, wherein the processor is configured to generate a target photograph by:
   identifying a plurality of background regions from the n frames of images, the plurality of background regions including one or more overlapping portions;
   combining the plurality of background regions based on the one or more overlapping portions of the background regions to obtain a target background region;
   extracting, from the n frames of images, at least two non-overlapping images of the moving object or at least two overlapping images of the moving object with an overlapping portion not exceeding a preset threshold; and
   generating the target photograph based on the target background region and the at least two non-overlapping or overlapping images of the moving object.

17. A non-transitory computer-readable storage medium having stored therein instructions that, when executed by a processor of an apparatus, cause the apparatus to perform a method for generating a photograph, the method comprising:
   acquiring n frames of images, wherein $n \geq 2$;
   identifying a moving object and one or more background regions included in the n frames of images;
   detecting, based on adjacent frames in the n frames of images, that a moving speed of the moving object is greater than a preset speed level; and
   generating a target photograph based on the moving object and the one or more background regions, wherein the target photograph includes at least two images of the moving object located in a same background region, and the at least two images of the moving object include at least two different motion states of the moving object.

* * * * *